United States Patent
Franklin et al.

(10) Patent No.: US 8,204,536 B2
(45) Date of Patent: Jun. 19, 2012

(54) AUTOMATIC PROVISIONING BASED ON COMMUNICATION NETWORK CONNECTIVITY AND CHARACTERISTICS

(75) Inventors: David Franklin, Seattle, WA (US); Todd D. Segal, Seattle, WA (US); Arthur K. T. Lam, Seattle, WA (US); Henry Y. T. Chen, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 11/955,548

(22) Filed: Dec. 13, 2007

(65) Prior Publication Data
US 2009/0156209 A1    Jun. 18, 2009

(51) Int. Cl.
*H04M 1/00* (2006.01)
(52) U.S. Cl. .................... 455/550.1; 455/552.1
(58) Field of Classification Search ............... 455/550.1, 455/552.1
See application file for complete search history.

(56) References Cited

U.S. PATENT DOCUMENTS

| | | | |
|---|---|---|---|
| 6,130,892 A | 10/2000 | Short et al. | |
| 6,701,144 B2 | 3/2004 | Kirbas et al. | |
| 6,717,919 B1 | 4/2004 | Ketcham et al. | |
| 6,892,230 B1 | 5/2005 | Gu et al. | |
| 6,965,576 B1 | 11/2005 | Lee et al. | |
| 6,970,474 B1 | 11/2005 | Sinha | |
| 7,051,087 B1 | 5/2006 | Bahl et al. | |
| 7,088,727 B1 | 8/2006 | Short et al. | |
| 7,496,360 B2 * | 2/2009 | Sindhwani et al. | 455/422.1 |
| 2002/0039892 A1 * | 4/2002 | Lindell | 455/151.1 |
| 2005/0125511 A1 | 6/2005 | Hunt | |
| 2006/0218286 A1 * | 9/2006 | Brombal et al. | 709/227 |
| 2007/0036118 A1 | 2/2007 | Shaffer et al. | |
| 2010/0240352 A1 * | 9/2010 | Suri et al. | 455/419 |

FOREIGN PATENT DOCUMENTS
WO    WO 2004031488 A1 *   4/2004

OTHER PUBLICATIONS

An Architecture for Location-based Service Mobility Using the SIP Event Model (6 pgs.) http://www.sigmobile.org/mobisys/2004/context_awareness/papers/mob_paper2.pdf.
Autoconfiguration, Registration and Mobility Management for Pervasive Computing (12 pgs.) http://www.research.ibm.com/people/a/archan/pcs2001.pdf.
Supporting Context-Aware Computing in Ad Hoc Mobile Environments (11 pgs.) http://www.cse.wustl.edu/~qingfeng/papers/proposal.pdf.

* cited by examiner

*Primary Examiner* — Marisol Figueroa
(74) *Attorney, Agent, or Firm* — Merchant & Gould

(57) ABSTRACT

A communication device and/or applications capable of facilitating communication through different networks are automatically provisioned based on recognition of network environment including network connectivity and characteristics. A user's multiple identities for different networks with varying capabilities and features are accommodated by detecting and prioritizing available network(s), then provisioning the device to enable the user to communicate through one or more of those networks. Communication types and media may vary depending on network type such as cellular, VOIP, and so on. The device may be configured to scan for new networks automatically periodically or based on location change, time change, etc.

16 Claims, 6 Drawing Sheets

METHODS

EXAMPLE NETWORKED
COMMUNICATION ENVIRONMENTS

EXAMPLE MULTI-MODE
COMMUNICATION DEVICE

AUTOMATIC (RE)PROVISIONING
BASED ON CONNECTIVITY AND
CHARACTERISTICS

NETWORK ENVIRONMENT

AUTOMATIC PROVISIONING BASED ON COMMUNICATION NETWORK CONNECTIVITY AND CHARACTERISTICS

BACKGROUND

With the proliferation of mobile devices and diversification of communication applications, users of computing devices are accessible through many communication modes. Electronic mail, text messaging, voicemail, video communication are just a few examples of communication that may be established through a variety of stationary (e.g. desktop) and mobile (e.g. handheld) computing devices. Moreover, many devices are capable of facilitating multiple modes of communication through a variety of networks. Voice Over Internet Protocol (VOIP) enabled phones are one example of such devices. User can talk over cellular networks, Wireless Local Area Networks (WLANs), or even wired networks through these devices.

Multi-modal communication devices are in many cases portable and are moved around by users exposing them to various networks. For example, a device capable of handling VOIP and cellular communications may be in range of a home network and the cellular network at the home of the user, in range of only the cellular network at another location, and in range of an enterprise wireless network at the work place of the user with each of these networks having different characteristics, permission rules, etc. Many users today tend to have multiple devices for use with different networks each set up differently.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling users to communicate through different communication networks while the communication device/application automatically acquires or discovers information needed to use services on a given network based on network connectivity and characteristics such that communications can be facilitated through different networks in different locations.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a device and/or application for providing communication over various networks may be automatically provisioned and re-provisioned based on available network(s) and network characteristics. Provisioning, as referred to herein, is the process of acquiring or discovering information needed to utilize services on a given network associating user and device data with network resources and class of services, referred to as a profile. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
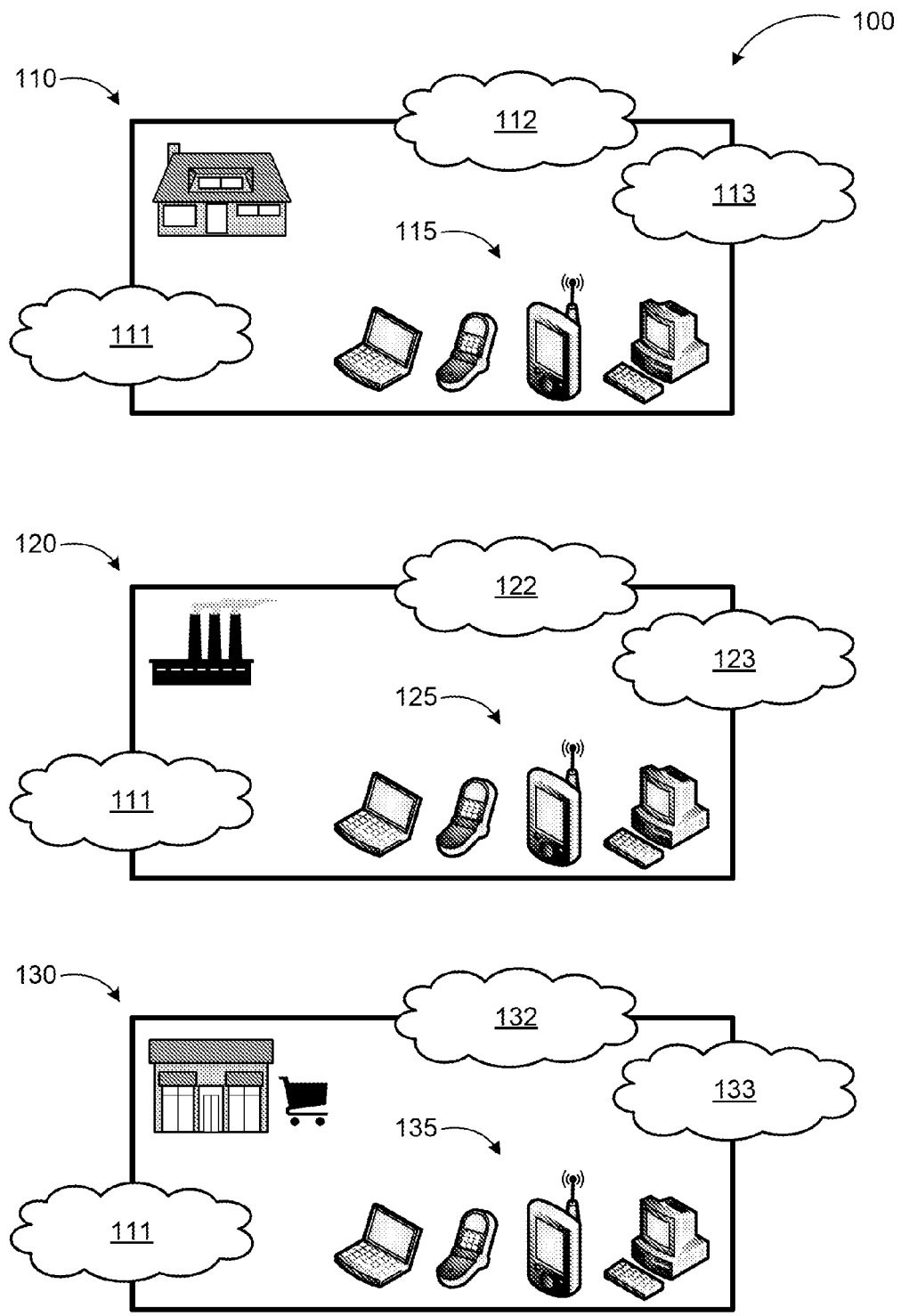
FIG. 1 illustrates example networked communication environments.

Referring to FIG. 1, three example networked communication environments are illustrated in diagram 100. While basic concepts of networked communication environments are discussed in the example environments of FIG. 1, other networked environments with additional or fewer features, components, and configurations may also be used to provide automatic provisioning of a communication device or application based on the available networks.

Portable devices enabled with multiple communication modes are becoming widely available. Users can have access to different services and resources at different locations (or different times of day) through these devices. Each device can run multiple communication applications (e.g. a cellular phone with Internet access may also run a VOIP application, an instant messaging application, and so on). Moreover, each user may have multiple devices that can execute the same or different applications, and each user may have multiple identities depending on the communication network used (even on the same network).

Networked environment 110 represents a home environment, where the user may have access to a cellular network 111, a wireless home network (WLAN) 112, and a wired network 113. The user may access these networks through a variety of devices 115. Some of these devices may be capable of providing communications over multiple networks. In addition, the user may have multiple identities such as a plurality of phone numbers through a VOIP service, a cellular service, and the like.

When the same user is at work environment 120, other networks may be accessible in addition to some of the previous ones. For example, the cellular network 111 may still be available, but the WLAN 122 may be a secure enterprise network with limitations on what communication applications can be run (the enterprise network may not allow the VOIP application). Wired network 123 may be a yet different network with distinct characteristics and capabilities. In work environment 120, a different VOIP application may be facilitated. So, the user could potentially have a VOIP identity for home use and another one for work use, each with different access privileges and capabilities (e.g. work VOIP identity may not allow international calls, while home identity may be associated with various call forwarding, voicemail, etc., features and allow all kinds of calls).

The third example environment 130 is a public environment such as a retail business with network access for its customers (e.g. and Internet coffee shop). The cellular network 111 may still be available at this environment in addition to a yet different WLAN 132 (open or secure), and another wired network. Each of these may again provide varying access privileges and capabilities to communication devices 135.

The example communication devices (115, 125, and 135) may include any type of computing device capable of executing one or more communication applications. These devices may be portable or stationary such as smart phones, personal digital assistants, laptop computers, desktop computers, and so on. The devices may be capable of wired or wireless (radio wave, optical, etc.) communication with available networks. Each device has typically a user interface that includes components for user input and audio-visual output to the user. One such example device is described below in conjunction with FIG. 2.

According to a preferred embodiment, a communication device capable of communicating through one or more networks is enabled to automatically provision itself for operating through a detected network. Such a device may maintain a cache of profiles. When a new network is encountered, the device automatically (without user interaction) determines which profile is suitable for this new environment and activates that profile allowing available services such as voice communications, video communications, instant messaging, local PBX extensions, international calling features, and the like, to be provided to the user at that location.

An example operation of a device according to a preferred embodiment may be as follows: (1) A network operator may provide data to the device through existing methods, the end user may enter data on the device, and the device may discover identity and services data from the network (using DHCP, MAC, FTP, HTTP, SIP, etc) upon detection of a new network. (2) Upon receiving a profile from the provisioning process, the device may store the profile in the profile cache; the device may index the profile in a variety of ways depending on the characteristics of the profile (network type, available services, etc.). (3) The device administrator or local user (depending on policy) may have an option to prioritize these profiles. Prioritization may occur both globally or more granularly (e.g. per requested service). Some prioritization possibilities may include user input (user choosing directly one profile over another), network characteristics (latency, physical medium such as WAN, cellular, etc, time of day, billing), and required service (local vs. long distance, PBX dialing, peer-to-peer, video capabilities, and the like). (4) Upon new network detection the device may use the profile cache and prioritization scheme to automatically enable the appropriate services without user intervention. These services may also be an aggregation of multiple profiles.

Figure 2:
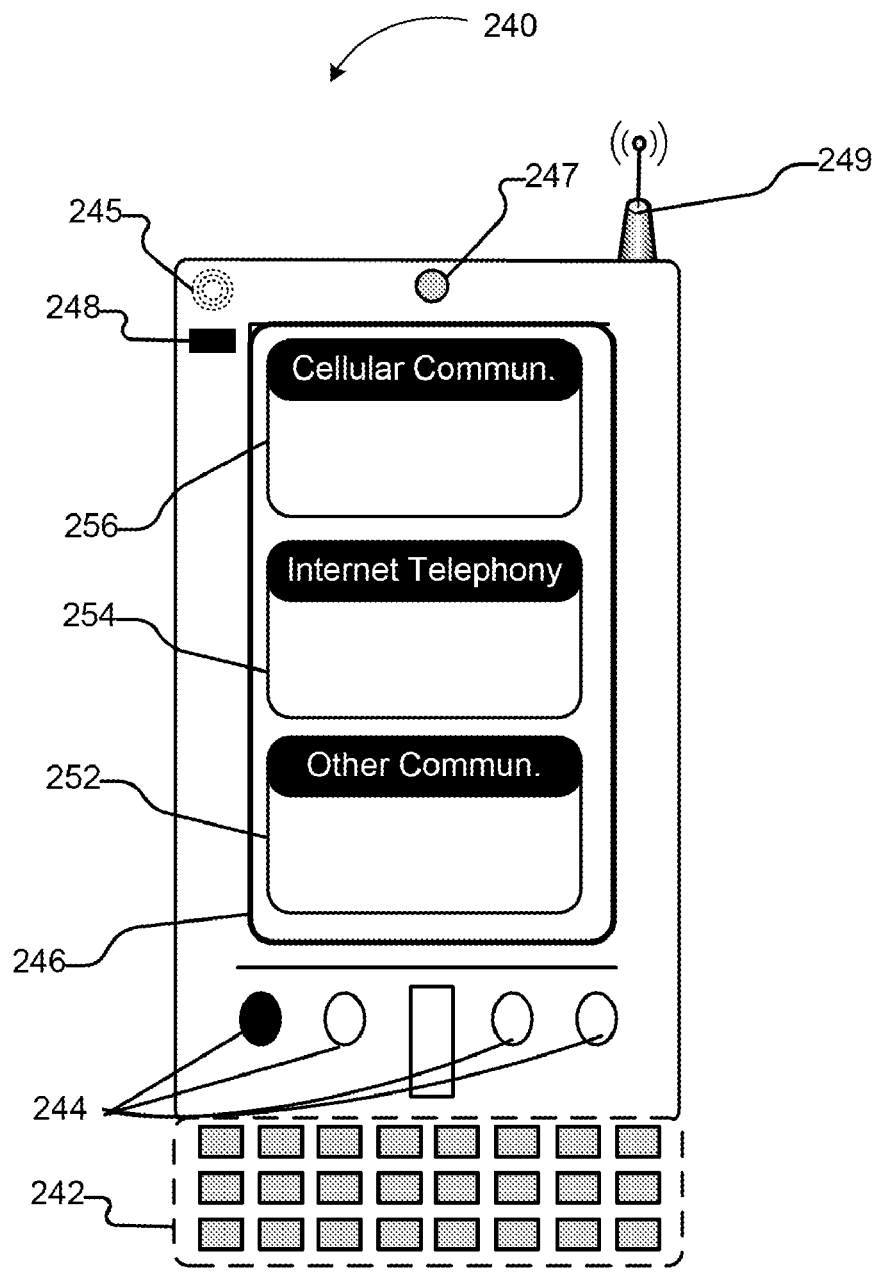
FIG. 2 illustrates an example multi-mode communication device.

FIG. 2 illustrates an example multi-mode portable communication device 240. As mentioned previously, devices that provide communication through multiple networks by automatically provisioning themselves may be portable or stationary and capable of executing multiple communication applications. However, portable devices are more likely to be better suitable for implementation of preferred embodiments.

The features described below for providing communication to a user through automatic provisioning may be implemented in any computing device including, but not limited to, a personal digital assistant, a cellular phone, a laptop PC, a smart automobile console, and the like.

Portable communication device 240 is shown with many features. However, embodiments may be implemented with fewer or additional components. Example portable communication device 240 includes typical components of a mobile device such as a hard keypad 242, specialized buttons ("function keys") 244, display 246, and one or more indicators (e.g. LED) 248. Portable communication device 240 may also include a camera 247 for video communications and microphone 245 for voice communications. Antenna 249 may be utilized for wireless communication with one or more networks. The device may also include multiple antennas (one for each type of network). Display 246 may be an interactive display (e.g. touch sensitive) and provide soft keys as well.

Portable communication device 240 is capable of executing communication applications 252, 254, and 256 for different types of networks. These communication applications may range from typical phone communication applications (cellular, VOIP) to video communication, and even other types of communications such as download services (music, videos, etc.), network-based conference applications (e.g. Live Meeting® by MICROSOFT CORP. of REDMOND, WA), print server access, and the like. As one skilled in the art may recognize, each of these different types of communication involve different resources on a network. In some cases, the availability of resources on the same network may change based on a number of factors (location, time, network load, etc.) and the portable device 240 may be configured to re-provision itself based on the availability of resources on any given network.

Figure 3:
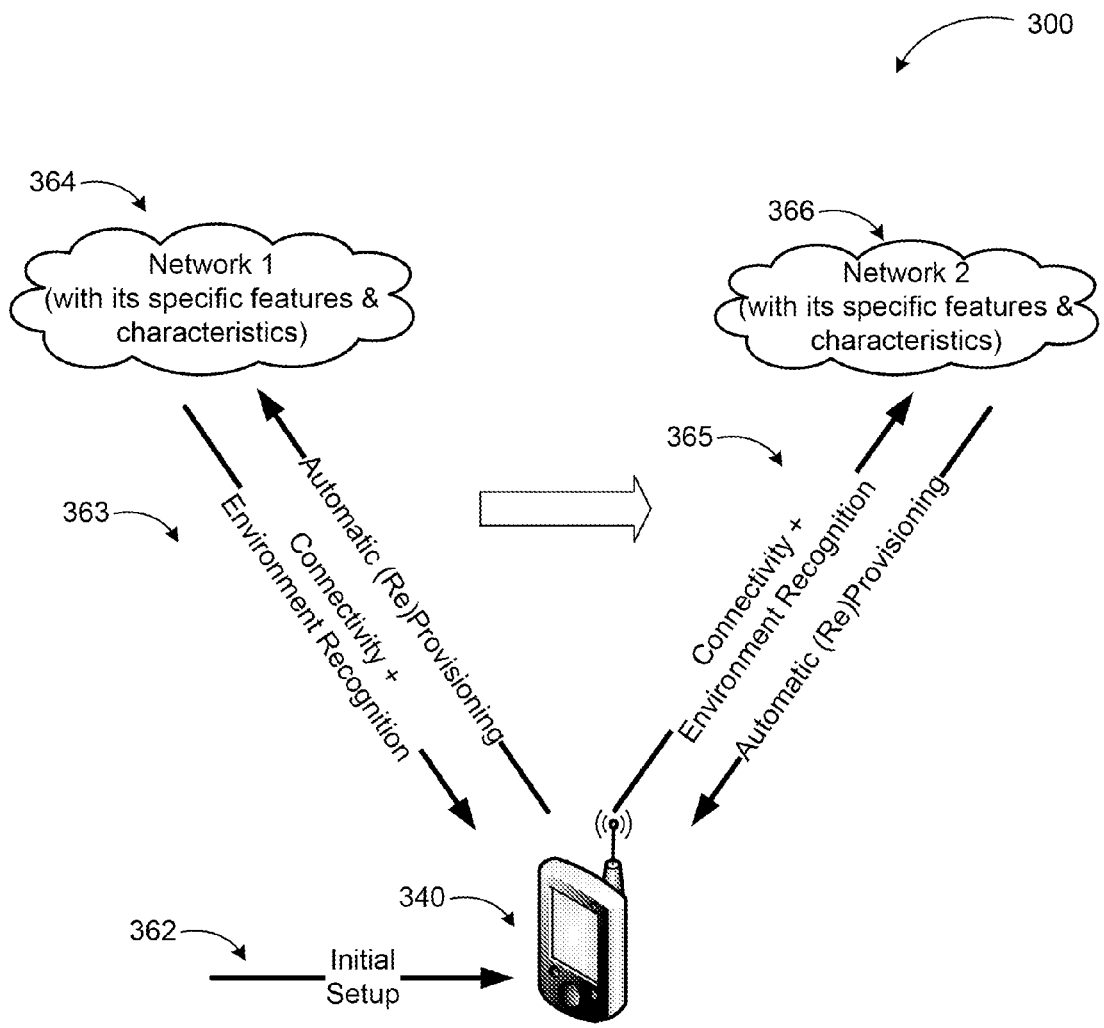
FIG. 3 is a conceptual diagram illustrating example automatic provisioning and re-provisioning of a multi-mode device based on connectivity and characteristics of different networks.

FIG. 3 is a conceptual diagram illustrating example automatic provisioning and re-provisioning of a multi-mode device based on connectivity and characteristics of different networks with their specific features and characteristics.

A critical step in the operation of a multi-mode communication device such as device 340 is initial setup 362, where some user involvement may be necessary (entering user information, initial network parameters such as encryption key, etc.). On the other hand, the initial set up may also be completely automated by the network detecting the device and providing all necessary information to get the device activated.

As discussed above, device 340 may be capable of facilitating communications through a plurality of networks. Some of these networks may co-exist in the same location (e.g. a cellular network and a WLAN). In that case, a default or user preference prioritization may be employed to determine which network is to be used. According to other embodiments, the device may provide the user the choice of network when the user wants to initiate communication and accept incoming communications from all available networks.

The initial setup is followed by two related steps connectivity+environment recognition and automatic (re)provisioning 363 for the first available network (364). Recognition of the network environment may include detection and determination of factors such as time of day (or day of week), location (e.g. with the help of a GPS receiver or network location signal), signal strength, characteristics of available servers, and the like. Once device 340 detects availability of network 1 (364) for connectivity and recognizes the network environment as one it can operate in, it may look up the provisioning parameters (physical and software parameters such as communication channel, device ID, communication application parameters, activating available features, etc.) and provision itself automatically to enable communications using network 1. If multiple networks are available the automatic provisioning may also include a determination of network prioritization.

When network 2 (366) becomes available the connectivity+environment recognition and automatic (re)provisioning steps 365 may be performed for this network in a similar fashion to the steps 363. Network 2 (366) may become available through a location change (user going to work from home), a time change (one network may be available only during certain periods of the week or day), or another reason (e.g. network signal becoming available). Whenever either one of the networks becomes available, device 340 may repeat the connectivity+environment recognition and automatic re-provisioning steps to take advantage of the new network. While the parameters for automatic provisioning may all be stored in device 340, part of all of those may also be pushed to the device by the available network. Moreover, when two or more networks are available, the device 340 may retain a union of the functionality of both networks (e.g. if one network provides VOIP communication and the other not, the device may still retain the VOIP functionality).

To determine if a new network is available, device 340 may scan automatically based on a period, a change in location, or another trigger mechanism (e.g. change in network signal strength). As mentioned above, the user may have different identities for each network (or even multiple identities for a given network). Device 340 may be configured to activate and employ one or more of those identities automatically or employ some form of security mechanism (password, biometric, etc.) to ensure security of the network and prevent unauthorized use of the user's account(s).

A typical example for a portable communication device according to embodiments is a mobile phone with VOIP capability. When the user purchases such as phone, it may configure itself for its cellular network first. Then, the phone may be configured for VOIP operation through the user's home network by recognizing the network and minimal input from the user (e.g. encryption key). After that, the phone may recognize the home network whenever it is in the home and provision itself to facilitate communications through the home network. Similarly, the phone may recognize and provision itself for the work WLAN network employing the user's work identity (phone number) and provision itself for that environment anytime the user is at work. Each of these networks may have varying features and capabilities, but the user would not have to reconfigure their phone each time they move from home to work and vice versa being able to communicate through the available network. Thus, a device according to a preferred embodiment is capable of changing its identity and capabilities in a fully automated manner (without any user interaction) when available networks change such as the user taking the device from home to work or vice versa.

The prioritized communication systems, components, features, and scenarios in FIG. 1, FIG. 2, and FIG. 3 are exemplary for illustration purposes. A device for facilitating communication over multiple networks by automatic provisioning based on network connectivity and characteristics may be implemented using additional or fewer components and features using the principles described herein. Other scenarios and communication types are also possible in a system like the one described here.

Figure 4:
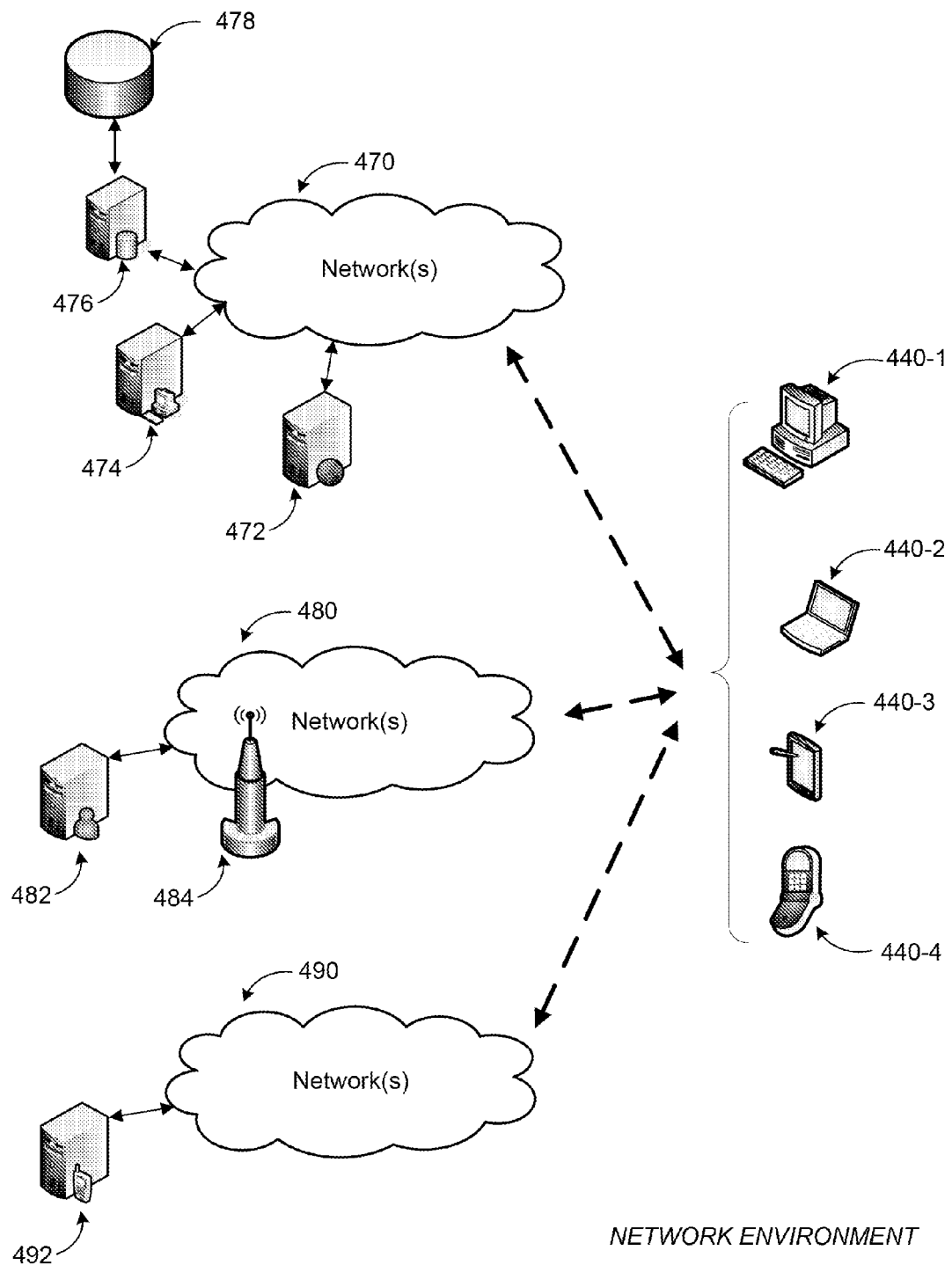
FIG. 4 is an example networked environment, where embodiments may be implemented.

FIG. 4 is an example networked environment, where embodiments may be implemented. A system for facilitating communication over multiple networks by automatic provisioning based on network connectivity and characteristics may be implemented locally on a single computing device or in a distributed manner over a number of physical and virtual clients and servers. The system may also be implemented in un-clustered systems or clustered systems employing a number of nodes communicating over one or more networks (e.g. network(s) 470, 480, 490, etc.).

Such a system may comprise any topology of servers, clients, Internet service providers, and communication media. Also, the system may have a static or dynamic topology. The term "client" may refer to a client application or a client device. While a networked system implementing automatic provisioning based on network connectivity and characteristics may involve many more components, relevant ones are discussed in conjunction with this figure.

Communication applications capable of automatically (re)provisioning based on network connectivity and characteristics may be implemented in individual client devices 440-1 through 440-4 or executed on a server (e.g. server 474) and accessed from anyone of the client devices (or applications).

Each network associated with a system according to embodiments may include a variety of unique components such as web server 472, cellular tower 484, and VOIP server 492 of networks 470, 480, and 490, respectively. On the other hand, some components such as database server 476 and data stores 478 may be found in most networks as a common component.

Networks 470, 480, and 490 may include a secure network such as an enterprise network or a cellular network, an unsecure network such as a wireless open network, or the Internet. Networks 470, 480, and 490 provide communication between the nodes described herein. By way of example, and not limitation, networks 470, 480, and 490 may include wired media such as a wired network or direct-wired connection, and wireless media such as acoustic, RF, infrared and other wireless media.

Many other configurations of computing devices, applications, data sources, data distribution systems may be employed to implement a system according to embodiments. Furthermore, the networked environments discussed in FIG. 4 are for illustration purposes only. Embodiments are not limited to the example applications, modules, or processes.

Figure 5:
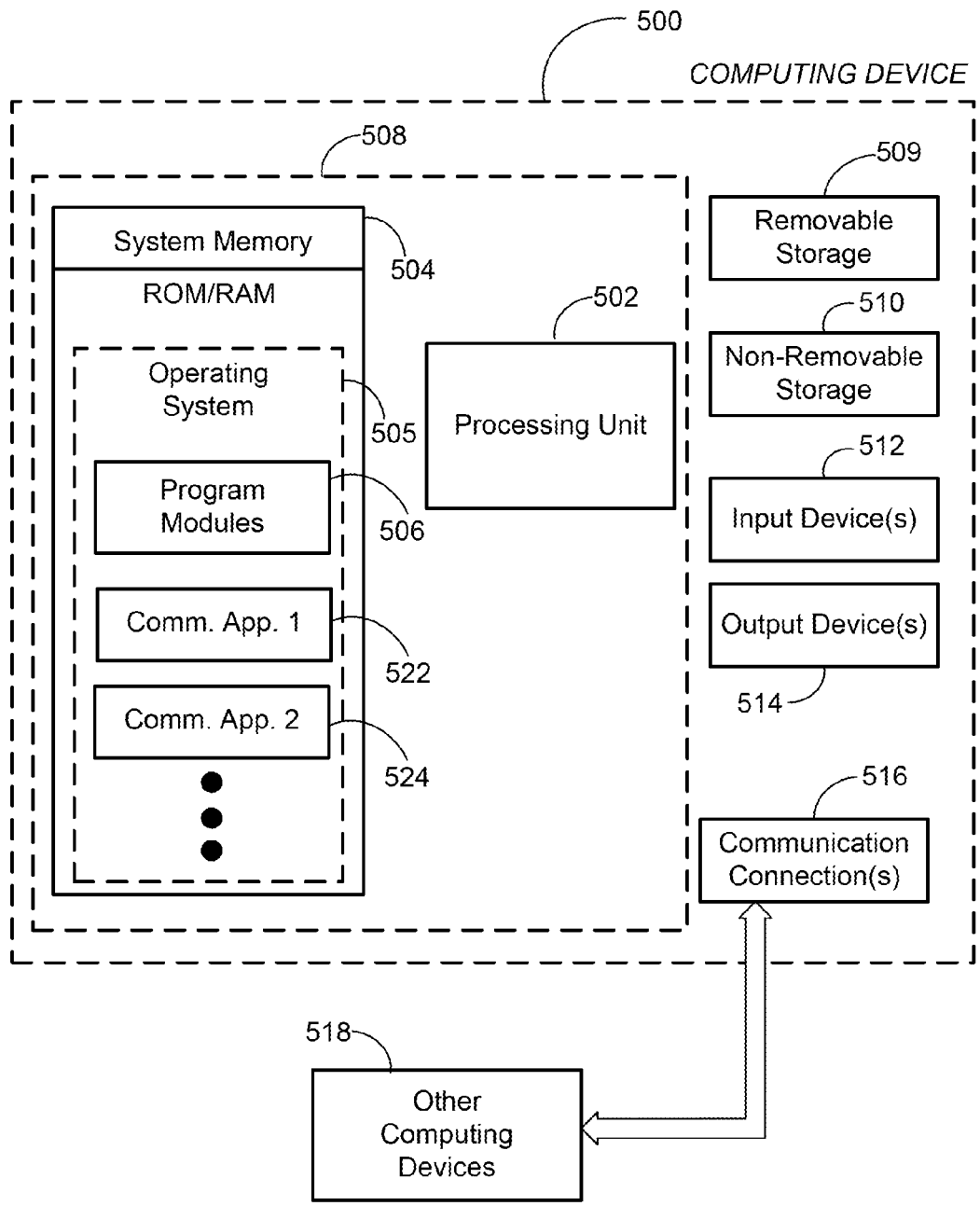
FIG. 5 is a block diagram of an example computing operating environment, where embodiments may be implemented.

FIG. 5 and the associated discussion are intended to provide a brief general description of a suitable computing environment in which embodiments may be implemented. With reference to FIG. 5, a block diagram of an example computing operating environment is illustrated, such as computing device 500. In a basic configuration, the computing device 500 may be a portable communication device providing communication through a number of different networks and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, communication application 1 (522), communication application 2 (524), and so on.

Communication applications 1 and 2 (522 and 524) may be separate applications or integral modules of a hosted service that provide communication through distinct networks while automatically provisioning themselves based on network connectivity and characteristics when the networks are available. Computing device 500 may also execute a separate prioritization module (not shown) to prioritize the communication applications when more than one network is available, as described previously. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that execute applications associated with a data access and directory service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
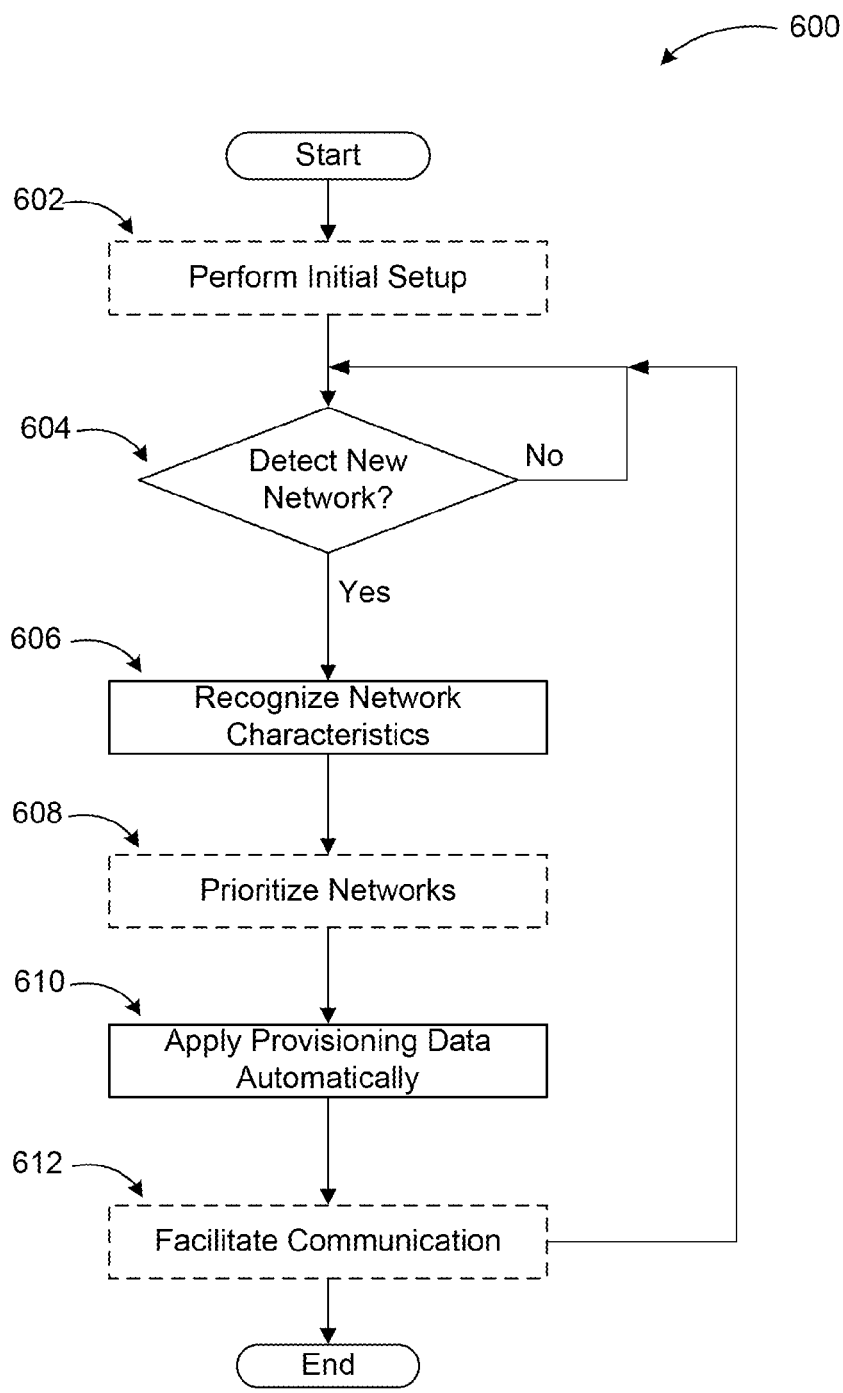
FIG. 6 illustrates a logic flow diagram for a process of automatically provisioning a communication device/application based on network connectivity and characteristics.

FIG. 6 illustrates a logic flow diagram for process 600 of automatically provisioning a communication device/application based on network connectivity and characteristics. Process 600 may be implemented in a portable communication device.

Process 600 begins with optional operation 602, where an initial setup is performed by the communication device. The initial setup may include some or no user involvement. Processing advances from optional operation 602 to decision operation 604.

At decision operation 604, a determination is made whether a new network is detected. If no network is detected, the device (and the communication application(s)) may scan the environment periodically or based on another trigger mechanism until a network is detected. If a network is detected, processing moves to operation 606.

At operation 606, network characteristics of the detected network are determined such as signal strength, available resources, etc. Processing moves from operation 606 to optional operation 608.

At optional operation 608, a prioritization is performed if more than one network is available. As discussed previously, a most preferred network (based on default or user preferences) may be used or more than one network may be made available to the user based on the prioritization. Processing advances from optional operation 608 to operation 610.

At operation 610, the communication device (and applications) is provisioned automatically applying stored or downloaded provisioning data. Automatic provisioning may include setup of the device's physical characteristics (transmission parameters, etc.) as well as software parameters (encryption, communication mode(s), activation of available features, etc.). Processing advances from operation 610 to optional operation 612.

At optional operation 612, communication is facilitated upon receiving an indication from the user to initiate communication or upon receipt of an incoming communication request from the available network(s). While communication is made available through detected (and configured for) networks, a new network may yet be detected (due to location or time change, etc.) followed by the operations 606-610. This is illustrated in the figure by the connecting line between optional operation 612 and decision operation 604. If no other network is detected after optional operation 612, processing moves to a calling process for further actions.

The operations included in process 600 are for illustration purposes. Automatically provisioning a communication device and/or applications based on network connectivity and characteristics may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing communications through multiple networks, the method comprising:
    detecting an available communication network;
    recognizing network characteristics;
    upon detecting the available communication network, utilizing a prioritization scheme on a granular basis, the prioritization scheme based on the network characteristics to automatically enable one of a plurality of available services provided by the available communication network, the network characteristics comprising latency, time of day and billing characteristics for the plurality of available services provided by the available communication network, the plurality of available services comprising calling features and at least one of a voice communications service and a video communications service;
    automatically provisioning at least one communication application based on the available communication network and the recognized network characteristics;
    detecting another available communication network;
    automatically provisioning the at least one communication application based on the another communication network; and
    facilitating communication through the available network employing the automatically provisioned communication application while retaining a union of functionality of both the available network and the another available network when the available network provides a communication service which is not provided by the another available communication network, the communication application being provisioned based on parameters pushed to the computing device by the available network, the provisioning parameters including at least the following: a communication channel, a communication format, a device identifier, a user identifier, and an activation of available features.

2. The method of claim 1, further comprising:
    performing an initial setup of the communication application prior to detecting the network, wherein the initial setup is fully automated.

3. The method of claim 1, further comprising:
    scanning available networks in response to one of: a change in user location, a change in time of day, a periodic scan timer, and a change in received signal strength;
    recognizing characteristics of any newly detected networks; and
    automatically re-provisioning the communication application based on the recognized characteristics of the newly detected networks.

4. The method of claim 3, further comprising:
    prioritizing the newly detected networks to determine a preferred network based on a default rule, the default rule comprising determining the preferred network based on a required service included in a cache of profiles maintained in the computing device, the required service comprising one or more of the following: a local communication service, a long distance communication service, a Private Branch Exchange (PBX) communication service, a peer-to-peer communication service and a video capability service; and
    automatically re-provisioning the communication application to facilitate communication through the preferred network only.

5. The method of claim 3, further comprising:
    automatically re-provisioning the communication application to facilitate communication through a selected one of the newly detected networks; and
    accepting an incoming communication request from any of the newly detected networks.

6. The method of claim 1, wherein the communication includes at least one from a set of: a phone call, a video call, an instant message session, an online meeting, access to a download service, and access to a network resource.

7. The method of claim 1, wherein the available communication network includes one of: a cellular network, a secure wireless network, an open wireless network, a wired network, and a combination network.

8. A computing device capable of executing a communication application for providing communications through multiple networks, comprising:
    a memory;
    a data store;
    a processor coupled to the memory and the data store, wherein the processor is configured to execute program instructions for:
        performing an initial setup of the communication application;
        detecting one or more available communication networks;
        recognizing network characteristics of the available communication networks;
        upon detecting the one or more available communication networks, utilizing a prioritization scheme on a granular basis, the prioritization scheme based on the network characteristics to automatically enable one of a plurality of available services provided by the one or more available communication networks, the network characteristics comprising latency, time of day and billing characteristics for the plurality of available services provided by the one or more available communication networks, the plurality of available services comprising calling features and at least one of a voice communications service and a video communications service;
        automatically provisioning the communication application based on the preferred one or more available communication networks and the recognized network characteristics; and
        facilitating communication through the one or more available communication networks employing the automatically provisioned communication application, the communication application being provisioned based on parameters pushed to the computing device by the one or more available communication networks, the provisioning parameters including at least the following: a communication channel, a communication format, a device identifier, a user identifier, and an activation of available features.

9. The system of claim 8, wherein the processor is further configured to automatically provision and execute at least one other communication application associated for a different available communication network.

10. The system of claim 8, wherein the processor is further configured to one of: activate and turn off at least one user interface component based on the automatic provisioning of the communication application.

11. The system of claim 8, wherein the communication application is capable of facilitating a plurality of user identities.

12. The system of claim 8, wherein the computing device is one of: a smart phone, a personal digital assistant, a laptop computer, and a smart automobile console.

13. The system of claim 8, wherein the processor is further configured to execute instructions for identifying the user to at least two communication networks with different access privileges and capabilities.

14. A computer-readable storage device with computer-executable instructions stored thereon which, when executed by a computer, perform a method for providing communications through multiple networks, the method comprising:
   performing an initial setup of a plurality of communication applications on a portable communication device;
   scanning available communication networks in response to one of: a change in the portable communication device location, a change in time of day, and a change in received signal strength;
   recognizing characteristics of any newly detected networks;
   upon detecting a newly detected network, utilizing a prioritization scheme on a granular basis, the prioritization scheme based on the network characteristics to automatically enable one of a plurality of available services provided by the newly detected network, the network characteristics comprising latency, time of day and billing characteristics for the plurality of available services provided by the newly detected network, the plurality of available services comprising calling features and at least one of a voice communications service and a video communications service;
   automatically provisioning one of the plurality of communication applications based on the newly detected network and the recognized characteristics of the newly detected network; and
   facilitating communication through the preferred newly detected network employing the automatically provisioned communication application, the communication application being provisioned based on parameters pushed to the portable communication device by the newly detected network, the provisioning parameters including at least the following: a communication channel, a communication format, a device identifier, a user identifier, and an activation of available features.

15. The computer-readable storage device of claim 14, wherein the method further comprises:
   detecting another communication network;
   recognizing the characteristics of the other communication network;
   automatically provisioning another of the plurality of communication applications based on the other communication network and the recognized characteristics of the other communication network; and
   facilitating communication through the other network employing the automatically provisioned other communication application.

16. The computer-readable storage device of claim 14, wherein the method further comprises:
   automatically re-provisioning one of the plurality of communication applications anytime a communication network becomes available and its characteristics are recognized.

* * * * *

UNITED STATES PATENT AND TRADEMARK OFFICE
CERTIFICATE OF CORRECTION

PATENT NO. : 8,204,536 B2
APPLICATION NO. : 11/955548
DATED : June 19, 2012
INVENTOR(S) : David Franklin et al.

Page 1 of 1

It is certified that error appears in the above-identified patent and that said Letters Patent is hereby corrected as shown below:

In the Claims:

In column 10, line 57, in Claim 8, after "the" delete "preferred".

Signed and Sealed this
Twenty-fifth Day of December, 2012

David J. Kappos
*Director of the United States Patent and Trademark Office*